(12) United States Patent (10) Patent No.: US 12,692,977 B2
Sharp et al. (45) Date of Patent: Jul. 28, 2026

(54) MECHANICAL LUBRICATING OIL SYSTEM WITH KIDNEY LOOP SYSTEM

(71) Applicant: STEWART & STEVENSON LLC, Houston, TX (US)

(72) Inventors: Brian Sharp, Houston, TX (US); John Lund, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 0 days.

(21) Appl. No.: 18/676,694

(22) Filed: May 29, 2024

(65) Prior Publication Data

US 2024/0426423 A1     Dec. 26, 2024

Related U.S. Application Data

(60) Provisional application No. 63/522,299, filed on Jun. 21, 2023.

(51) Int. Cl.
| | |
|---|---|
| *F16N 7/38* | (2006.01) |
| *F16N 29/00* | (2006.01) |
| *F16N 39/02* | (2006.01) |
| *F16N 39/04* | (2006.01) |
| *F16N 39/06* | (2006.01) |
| *F16N 13/20* | (2006.01) |

(52) U.S. Cl.
CPC .............. *F16N 7/38* (2013.01); *F16N 29/00* (2013.01); *F16N 39/02* (2013.01); *F16N 39/04* (2013.01); *F16N 13/20* (2013.01); *F16N 39/06* (2013.01); *F16N 2200/10* (2013.01);

*F16N 2230/02* (2013.01); *F16N 2250/08* (2013.01); *F16N 2270/56* (2013.01); *F16N 2280/00* (2013.01)

(58) Field of Classification Search
CPC . F16N 7/38; F16N 29/00; F16N 39/02; F16N 39/04; F16N 2200/10; F16N 2250/08; F16N 2270/56
See application file for complete search history.

(56) References Cited

U.S. PATENT DOCUMENTS

| | | | | |
|---|---|---|---|---|
| 4,209,079 | A * | 6/1980 | Marchal | F16C 37/002 |
| | | | | 241/176 |
| 10,753,280 | B2 * | 8/2020 | Thiriet | F02C 3/04 |
| 11,136,908 | B2 * | 10/2021 | McCormick | F01M 5/002 |
| 11,920,585 | B1 * | 3/2024 | Beck | F04B 53/18 |
| 2009/0200114 | A1 * | 8/2009 | Bagepalli | F03D 80/70 |
| | | | | 184/6.22 |
| 2010/0135793 | A1 * | 6/2010 | Krauss | F16N 39/04 |
| | | | | 416/1 |
| 2018/0080366 | A1 * | 3/2018 | Toyama | F16H 57/0412 |
| 2019/0128442 | A1 * | 5/2019 | Lee | F16K 11/10 |
| 2019/0284973 | A1 * | 9/2019 | Kim | F01M 5/02 |

(Continued)

*Primary Examiner* — Minh Truong
(74) *Attorney, Agent, or Firm* — Ewing & Jones, PLLC

(57) ABSTRACT

A lubricating system includes a kidney loop. The kidney loop includes a reservoir and a kidney loop pump, the kidney loop pump in fluid connection with the reservoir. The kidney loop also includes a cooler, the cooler in fluid connection with the kidney loop pump and a heater, the heat in fluid connection with the kidney loop pump. Further, the kidney loop includes a kidney loop motor, the kidney loop motor in electrical connection with the kidney loop pump and a control system, the control system in electrical connection with the kidney loop motor.

7 Claims, 2 Drawing Sheets

(56)        References Cited

U.S. PATENT DOCUMENTS

| | | | |
|---|---|---|---|
| 2020/0127352 A1* | 4/2020 | Tokozakura | ............ F16N 39/02 |
| 2020/0208776 A1* | 7/2020 | Bayyouk | ................... F16N 7/38 |
| 2020/0362747 A1* | 11/2020 | Sano | ........................ F01P 7/14 |
| 2023/0116598 A1* | 4/2023 | Oriol | ........................ F01M 1/22 |
| | | | 60/39.08 |
| 2023/0323941 A1* | 10/2023 | Deport | ..................... F16N 7/38 |
| | | | 184/6 |
| 2024/0035402 A1* | 2/2024 | Sharp | .................... F01M 5/001 |
| 2024/0125271 A1* | 4/2024 | Yamarthi | .............. H10N 10/13 |

* cited by examiner

MECHANICAL LUBRICATING OIL SYSTEM WITH KIDNEY LOOP SYSTEM

CROSS-REFERENCE TO RELATED APPLICATIONS

This application is a nonprovisional application which claims priority from U.S. provisional application No. 63/522,299, filed Jun. 21, 2023, which is incorporated by reference herein in its entirety.

TECHNICAL FIELD/FIELD OF THE DISCLOSURE

The present disclosure relates generally to lubricating oil systems.

BACKGROUND OF THE DISCLOSURE

Mechanical equipment often requires lubricating oil to function. During start up, the lubricating oil is typically below a desired startup temperature for pumping to the mechanical elements that need the lubricating oil. When the oil is below the minimum startup temperature, its viscosity is often undesirable (between 0 and 80 centipoise), which has detrimental effects on the mechanical system. For example, low temperature lubricating oil requires higher horsepower draw on the mechanical mover, such as an electric motor. In addition, lubricating oil may typically be unable to move completely through the system. Further, if the lubricating oil is too viscous, the lubricating oil is unable to reach other components of the system, and subsequently these components will be in direct contact rather than lubricated as designed.

SUMMARY

The present disclosure provides for a lubricating oil system. The lubricating oil system includes a kidney loop. The kidney loop includes a reservoir and a kidney loop pump, the kidney loop pump in fluid connection with the reservoir. The kidney loop also includes a cooler, the cooler in fluid connection with the kidney loop pump and a heater, the heater in fluid connection with the kidney loop pump. Further, the kidney loop includes a kidney loop motor, the kidney loop motor in mechanical connection with the kidney loop pump and a control system, the control system in electrical connection with the kidney loop motor.

The present disclosure also provides for a method for controlling the temperature of lubricating oil. The method includes supplying a kidney loop. The kidney loop includes a reservoir and a kidney loop pump, the kidney loop pump in fluid connection with the reservoir. The kidney loop also includes a cooler, the cooler in fluid connection with the kidney loop pump and a heater, the heat in fluid connection with the kidney loop pump. Further, the kidney loop includes a kidney loop motor, the kidney loop motor in mechanical connection with the kidney loop pump and a control system, the control system in electrical connection with the kidney loop motor, the control system including a thermostat. The method also includes measuring the temperature of the lubricating oil using the thermostat and if the temperature of the lubricating oil as measured by the thermostat is below a minimum set point temperature, operating the kidney loop motor at less than an oil warmup target and circulating the lubricating oil through the heater.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
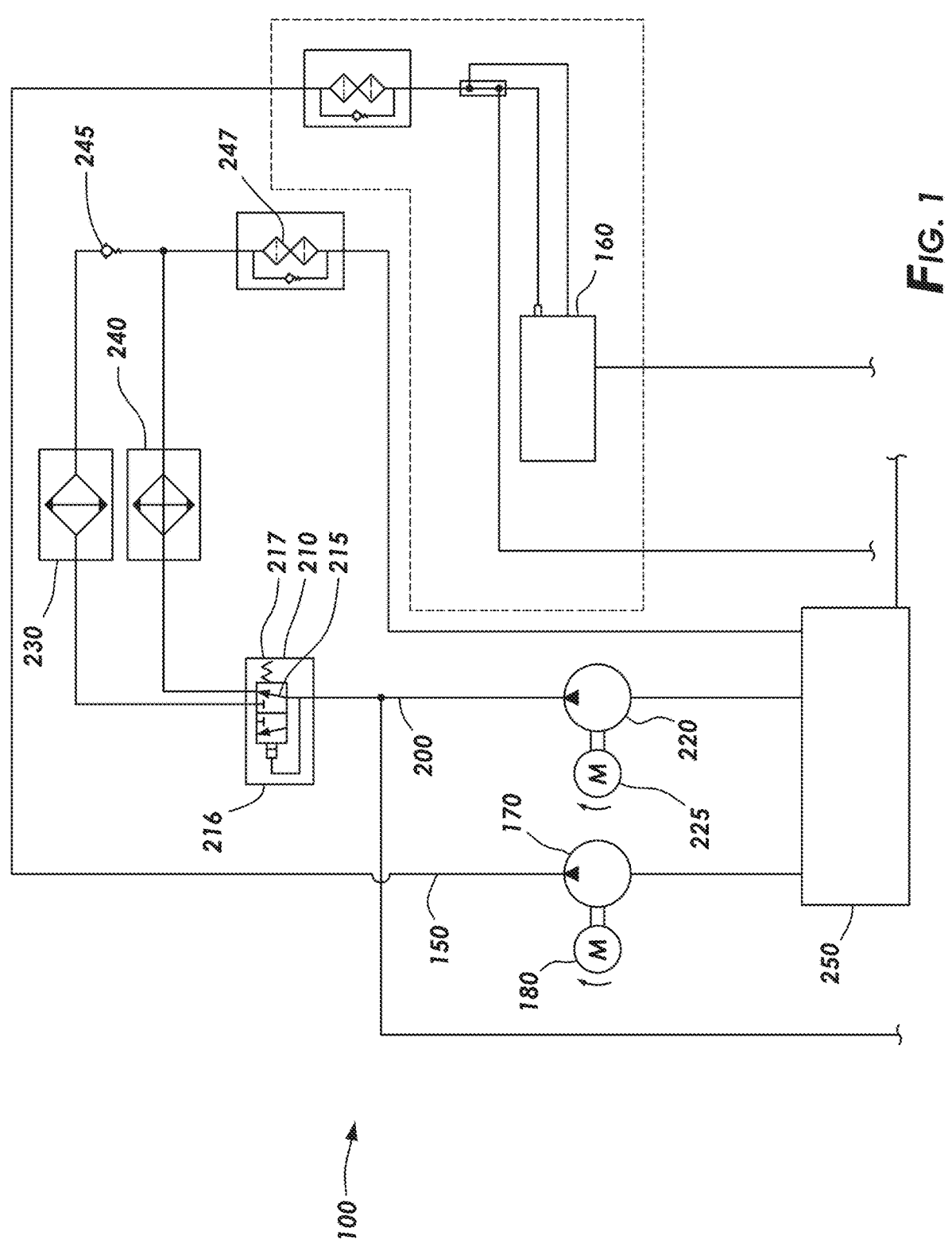
FIG. 1 is a schematic view of a lubricating oil system consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In certain embodiments, the disclosure is directed to a system to monitor the temperature and control the flow rate of lubricating oil. In some embodiments, a control system controls the flow rate of a kidney loop for a lube oil pump.

FIG. 1 depicts a schematic of an embodiment of lubricating oil system 100. Lubricating oil system 100 includes power end loop 150 and kidney loop 200. Power end loop 150 includes machinery 160, reservoir 250, and power end loop pump 170, all of which are in fluid connection. In certain embodiments, such as that shown in FIG. 1, machinery 160 may be a power end (the drive end of a power pump). Power end loop pump 170 may be electrically connected to power end loop motor 180. Power end loop pump 170 may be, for example and without limitation, a gear pump. When the lubricating oil temperature in reservoir 250 is determined by control system 210 to be above a minimum set point temperature, lubricating oil may be pumped using power end loop pump 170 to machinery 160 and then returned to reservoir 250.

Kidney loop 200 includes reservoir 250, kidney loop pump 220, control system 210, cooler 230, heater 240, filter 247, and check valve 245. Reservoir 250, kidney loop pump 220, control system 210, filter 247, and check valve 245 are in fluid connection with each other and with cooler 230 and heater 240. In certain embodiments, cooler 230 and heater 240 are not in fluid connection with each other as check valve 245 and control system 210 may restrict fluid movement between heater 240 and cooler 230. In other embodiments, control system 210 may allow fluid movement to both heater 240 and cooler 230. Kidney loop pump 220 may be, for example and without limitation, a gear pump. Kidney loop pump 220 may be in electrical communication with kidney loop motor 225. Cooler 230 may include cooling fans, for example and without limitation. Heater 240 may be, for example and without limitation, an immersive heater.

Control system 210 may include thermostat 215 and valve 217 and be in electrical communication with kidney loop pump 220 and power end loop pump 170. Control system 210 may include thermostat 215 to monitor the temperature of the lubricating oil within kidney loop 200. Control system 210 may further include valve 217. Valve 217 may be, for example, a thermostatic three-way valve capable of switching flow through kidney loop 200 between cooler 230 and heater 240 based on a signal from microprocessor 216. Further, control system 210 may include microprocessor 216.

During operation of control system 210, data from thermostat 215 is communicated to the microprocessor 216. As discussed below in detail, based on the data from thermostat 215, valve 217 may direct the flow of lubricating oil through either heater 240 or cooler 230.

Microprocessor 216 may also change the speed of kidney loop motor 225 to change the flow rate of the lubricating oil to reach a set point temperature. Microprocessor 216 also monitors the kidney loop motor 225 output power to avoid overheating of kidney loop motor 225.

Control system 210 operates to bring the lubricating oil to a set point temperature and, in some embodiments, to limit power use of kidney loop motor 225. When the lubricating oil is below the minimum setpoint temperature, the viscosity of the oil may be too low to properly operate machinery 160. If the lubricating oil is too viscous, it is unable to reach machinery 160, and portions of machinery 160 may be in direct contact rather than lubricated.

In certain embodiments of the present disclosure, a multistage method is used to control kidney loop pump 220, circulating the lubricating oil so that the lubricating oil can be thoroughly heated without overloading kidney loop motor 225. In certain embodiments of the present disclosure, microprocessor 216 may continuously or periodically monitor kidney loop motor 225 horsepower draw. As the lubricating oil is heated, the load on kidney loop motor 225 decreases, which allows control system 210 to increase kidney loop motor 225, for example and without limitation from 0 to 60 Hz to heat the lubricating oil, for example and without limitation from 0 to 210 F in a reduced amount of time without overloading the drive. At such time that the set point temperature for the lubricating oil is met, microprocessor 216 then causes the lubricating oil to be pumped at the set point temperature (and therefore viscosity) (0 to 210 F, 0 to 80 centipoise). Once the lubricating oil is heated to the set point temperature (0 to 210 F), the microprocessor then slows kidney loop motor 225 from the existing operating speed, to limit flow through cooler 230 located within kidney loop 200.

Kidney loop 200 continues to operate at a lower rate until the designated set point temperature is achieved. Once set point temperature is met, microprocessor 216 monitors the lubricating oil temperature and regulates the temperature by increasing or decreasing the lubricating oil flow though cooler 230 in kidney loop 200.

Figure 2:
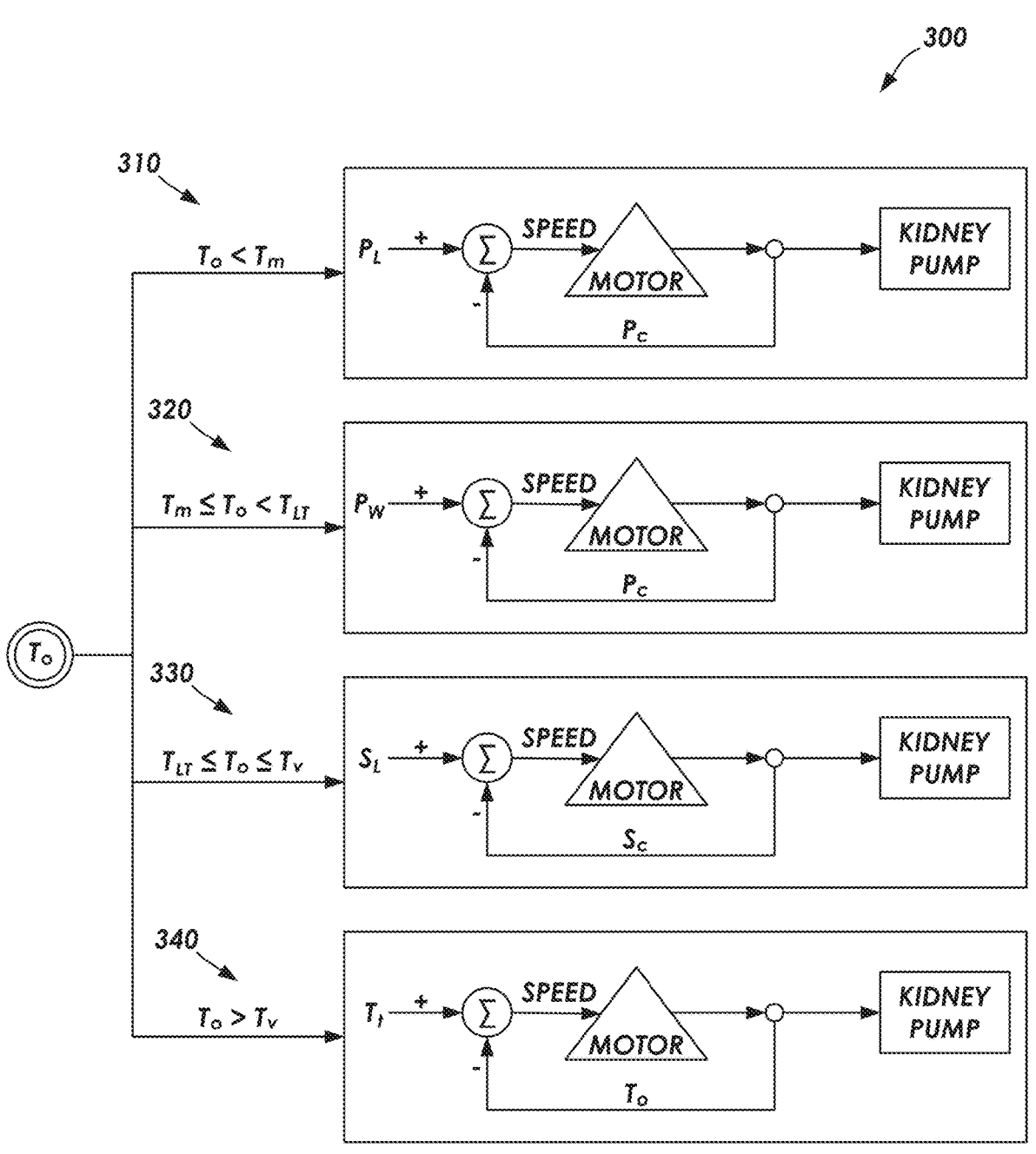
FIG. 2 is a control schematic view of the operation of the kidney loop pump.

Certain embodiments of the operation of kidney loop 200 are shown in FIG. 2 in flow scheme 300. In low temperature loop 310, the lubricating oil temperature ($T_o$) is below the minimum set point temperature ($T_m$). Kidney loop pump 220 is operated at a low speed by controlling kidney loop motor 225 at a low power target ($P_L$) and the lubricating oil is run through heater 240 to increase the temperature of the lubricating oil, i.e., control system 210 is set to control on low power target.

In medium temperature loop 320, the lubricating oil temperature ($T_o$) is at or above the minimum set point temperature ($T_m$) but less than the thermostat temperature (Tv), and in the embodiment shown in FIG. 2, is less than a low target temperature ($T_{LT}$). The low target temperature is a predetermined temperature below the thermostat temperature. In certain embodiments, the low target temperature may be between 2 and 10 degrees below the thermostat temperature or about 5 degrees below the thermostat temperature (all temperatures in degrees Fahrenheit). When operating in medium temperature loop 320, the power sent to kidney loop motor 225 is at oil warmup power target ($P_W$) level to operate kidney loop pump 220 at an oil warmup power target. Oil warmup power target is at a current level designed to operate kidney loop pump at a higher flow rate than when in low temperature loop 310 when operating at low power target. The lubricating oil is run through heater 240 to increase the temperature of the lubricating oil. Control system 210 is set to control to oil warmup power target.

In steady state temperature loop 330, the lubricating oil is in a set point range between the low target temperature and the thermostat temperature. Kidney loop motor 225 speed in steady state temperature loop 330 is set to reduce the amount of lubricating oil traveling through cooler 230 to a set point target low motor speed ($S_L$) below the oil warmup target, i.e., control system 210 is set to control to low motor speed.

In high temperature loop 340, the operating temperature of the lubricating oil exceeds that of the thermostat temperature. In high temperature loop 340, kidney loop motor 225 speed is increased from that of steady state temperature loop 330 to a cooling target to increase the flow rate of the lubricating oil through cooler 230, i.e., control system 210 is set to control to operating target temperature ($T_t$).

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A lubricating oil system including lubricating oil comprising:

a kidney loop, the kidney loop having:
   a reservoir;
   a kidney loop pump, the kidney loop pump in fluid connection with the reservoir;
   a cooler, the cooler in fluid connection with the kidney loop pump;
   a heater, the heater in fluid connection with the kidney loop pump, wherein the cooler and the heater are not in fluid communication and wherein the heater is an immersive heater;
   a check valve, the check valve positioned between the heater and the cooler adapted to prevent flow between the heater and the cooler at an outlet of the cooler;
   a kidney loop motor, the kidney loop motor in mechanical connection with the kidney loop pump; and
   a control system, the control system in electrical connection with the kidney loop motor; wherein the control system includes a thermostat, a valve, and a microprocessor, wherein the valve is in fluid communication with the cooler and the heater, and wherein the thermostat and the valve are in data communication with the microprocessor, the control system adapted to: measure the temperature of the lubricating oil using the thermostat; measure the kidney loop motor horsepower draw; when the temperature of the lubricating oil as measured by the thermostat is below a minimum set point temperature, operate the kidney loop motor at less than an oil warmup target and circulate the lubricating oil through the heater.

2. The lubricating oil system of claim 1 further comprising a filter, the filter in fluid connection with the heater and cooler.

3. The lubricating system of claim 1, wherein the valve is a thermostatic three-way valve.

4. The lubricating system of claim 3, wherein the thermostatic three-way valve is adapted to switch flow between the cooler and the heater.

5. The lubricating oil system of claim 1, wherein the kidney loop pump is a gear pump.

6. The lubricating oil system of claim 1 further comprising a power end loop.

7. The lubricating oil system of claim 6, wherein the power end loop comprises:

machinery;

a power end pump in fluid connection with the machinery;

the reservoir in fluid connection with the power end pump; and a power end loop motor in mechanical connection with the power end pump.

\* \* \* \* \*